United States Patent [19]

Takuma et al.

[11] Patent Number: 5,300,475
[45] Date of Patent: * Apr. 5, 1994

[54] SUBLIMATION THERMAL TRANSFER PRINTING SHEET COMPRISING NOVEL MAGENTA DYESTUFFS

[75] Inventors: Keisuke Takuma; Tsukasa Ohyama; Tamio Mikoda, all of Ohmuta; Isamu Ghoda, Kobe; Hitoshi Koshida, Nishinomiya; Akitoshi Igata, Ohmuta, all of Japan

[73] Assignee: Mitsui Toatsu Chemicals Chemicals, Incorporated, Tokyo, Japan

[*] Notice: The portion of the term of this patent subsequent to Dec. 1, 2009 has been disclaimed.

[21] Appl. No.: 937,029

[22] Filed: Aug. 31, 1992

Related U.S. Application Data

[63] Continuation of Ser. No. 550,745, Jul. 10, 1990, Pat. No. 5,168,092, which is a continuation-in-part of Ser. No. 291,896, Dec. 29, 1988, abandoned.

[30] Foreign Application Priority Data

Dec. 29, 1987 [JP] Japan .................. 62-333167
Dec. 29, 1987 [JP] Japan .................. 62-333168
Jan. 13, 1988 [JP] Japan .................. 63-003686

[51] Int. Cl.⁵ .................. B41M 5/035; B41M 5/38
[52] U.S. Cl. .................. 503/227; 428/195; 428/913; 428/914
[58] Field of Search .................. 8/471; 428/195, 913, 428/914; 503/227

[56] References Cited

U.S. PATENT DOCUMENTS

| | | | |
|---|---|---|---|
| 2,733,071 | 12/1956 | Pizzarello et al. | 260/380 |
| 3,174,983 | 3/1965 | Ramanathan | 260/380 |
| 3,189,398 | 6/1965 | Pizzarello et al. | 8/39 |
| 3,642,476 | 2/1972 | Mesley | 96/38 |
| 3,715,373 | 2/1973 | Andrews | 260/380 |
| 4,485,043 | 11/1984 | Kniel | 260/380 |
| 4,710,320 | 12/1987 | Hattori et al. | 260/378 |
| 4,725,284 | 2/1988 | Black et al. | 8/471 |

FOREIGN PATENT DOCUMENTS

| | | | |
|---|---|---|---|
| 0209990 | 1/1987 | European Pat. Off. | 503/227 |
| 1940184 | 3/1971 | Fed. Rep. of Germany | 503/227 |
| 2009468 | 9/1971 | Fed. Rep. of Germany | 503/227 |
| 3524833 | 1/1986 | Fed. Rep. of Germany | 503/227 |
| 1262253 | 4/1961 | France | 503/227 |
| 1264242 | 5/1961 | France | 503/227 |
| 2451393 | 10/1980 | France | 503/227 |
| 59-78896 | 5/1984 | Japan | 503/227 |
| 60-131293 | 7/1985 | Japan | 503/227 |
| 60-159091 | 8/1985 | Japan | 503/227 |
| 61-227093 | 10/1986 | Japan | 503/227 |
| 61-268495 | 11/1986 | Japan | 503/227 |
| 62-138559 | 6/1987 | Japan | 503/227 |
| 64-77584 | 3/1989 | Japan | 503/227 |
| 900127 | 7/1962 | United Kingdom | 503/227 |

OTHER PUBLICATIONS

CA 100:201052a (1984).
CA 104:99582s (Mar. 1986).
CA 106:166316q (1987).
CA 80:49255c (1974).

*Primary Examiner*—B. Hamilton Hess
*Attorney, Agent, or Firm*—Millen, White, Zelano & Branigan

[57] ABSTRACT

Disclosed are magenta anthraquinone dyestuffs for sublimation thermaltransfer printing of one of the formulas

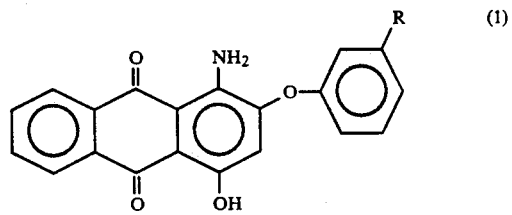

(Abstract continued on next page.)

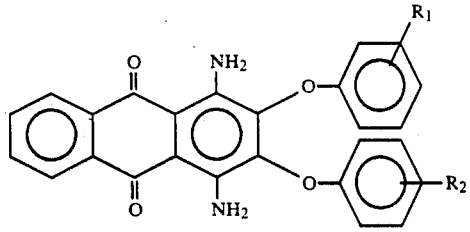
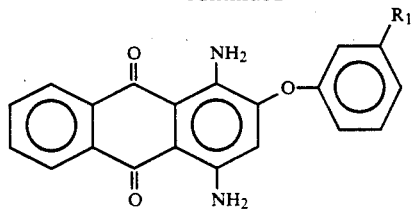
wherein R is a halogen atom, methyl or methoxy; wherein $R_1$ is a hydrogen atom, hydroxyl, a halogen atom, alkyl of 1 to 4 carbon atoms or alkoxy of 1 to 4 carbon atoms; and wherein $R_2$ is a hydrogen atom, a halogen atom, alkyl or 1 to 4 carbon atoms or alkoxy of 1 to 4 carbon atoms, with the proviso that in formula (3) either $R_1$ or $R_2$ is not a hydrogen atom.
3 Claims, No Drawings

SUBLIMATION THERMAL TRANSFER PRINTING SHEET COMPRISING NOVEL MAGENTA DYESTUFFS

This is a continuation of application Ser. No. 07/550,745, filed Jul. 10, 1990, now U.S. Pat. No. 5,168,092, which is a continuation-in-part of Ser. No. 07/291,896, filed Dec. 29, 1988, now abandoned.

BACKGROUND OF THE INVENTION (1) Field of the Invention

The present invention relates to magenta anthraquinone dyestuffs for use in sublimation thermaltransfer and to sublimation thermaltransfer sheets comprising one or more thereof.

More specifically, the present invention relates to magenta anthraquinones having good adhesion and color development properties as well as excellent fastness which can be used in a method for producing images using a thermal head for heating and sublimation transfer thereof. The anthraquinones of this application are characterized by high color density and excellent solubility when employed in sublimation thermaltransfer printing sheets, which printing sheets have high transferring speed. In these respects, this invention surpasses the prior art.

The anthraquinones of the present invention are useful for producing colored hard copies through a CRT color display, a color facsimile, a magnetic camera and the like utilizing a transfer type heat-sensitive recording system as the means for recording information.

(2) Description of the Prior Art

Japanese Patent Laid-open Publication No. 78896/1984 discloses the use of compounds represented by the following general formula (A) as a magenta dyestuff for sublimation thermaltransfer:

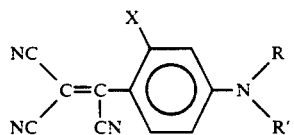

(A)

wherein X is a hydrogen atom or methyl group, and R and R' each is a methyl group, ethyl group or straight-chain or branched propyl or butyl group.

However, dyestuffs having the general formula (A) have poor light fade resistance and thus the preservation of information records employing this dyestuff is defective.

In Japanese Patent Laid-open Publication No. 131293/1985, as magenta dyestuffs for sublimation thermaltransfer there are disclosed anthraquinones which are represented by the following general formula (B):

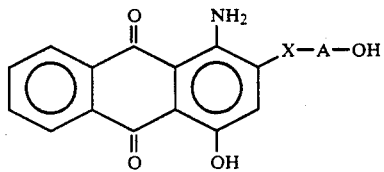

(B)

wherein X is an oxygen atom or sulfur atom, and A is a straight-chain or branched alkylene group, alkylene-O-alkylene group, alkylene-S-alkylene group, cyclohexylene group, phenylene group,

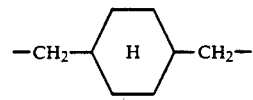

or

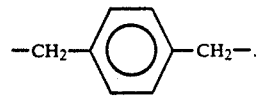

However, undesirably a great deal of energy is required to transfer this dyestuff and the cost of a machine which uses this dyestuff is thus uneconomically high.

Moreover, known 1-amino-2-phenoxy-4-hydroxyanthraquinone (CI. No. Disp Red 60), 1-amino-2-phenylthio-4-hydroxyanthraquinone (Japanese Patent Laid-open Publication No. 159091/1985) and 1,4-diamino-2,3 bisphenoxyanthraquinone (Japanese Patent Laid-open Publication No. 268495/1986) are also used, but they have poor solubility in solvents employed in an ink-based process, they have poor sublimation properties and are unsatisfactory with respect to dyestuff adhesion and fastness properties.

Moreover, these anthraquinone dyestuffs have a yellowish color and therefore magenta dyestuffs in which absorption occurs in a longer wave length range are in strong demand.

Japanese Patent Laid-open Publication No. 227093/1986 discloses an anthraquinone dyestuff, for heat-sensitive transfer recording, represented by the following general formula:

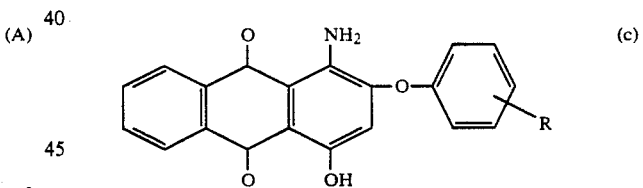

(c)

wherein R is an alkyl of 2 to 10 carbon atoms, an alkoxy of 2 to 10 carbon atoms, or trifluoromethyl.

Japanese Patent Laid-open Publication No. 138559/1987 discloses an anthraquinone dyestuff represented by the following general formula:

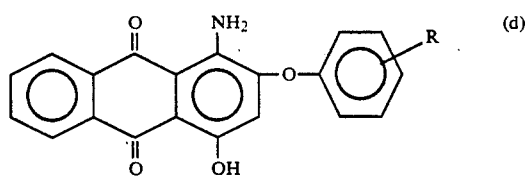

(d)

wherein R is an alkyl such that the total molecular weight of the anthraquinone is more than 350.

However, recorded images on transfer sheets which comprise a dyestuff having the above general formulas (c) and (d) do not have satisfactory light-fade resistance or color-fastness.

SUMMARY OF THE INVENTION

In a composition aspect, the present invention is directed to magenta anthraquinones dyestuffs useful for sublimation thermaltransfer processes which are represented by one of the formulae

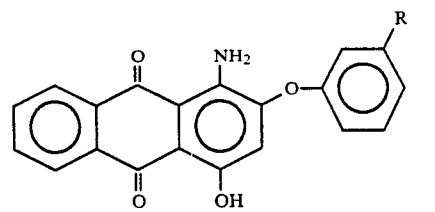

(1)

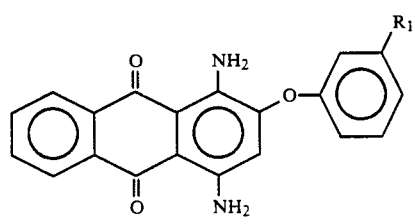

(2)

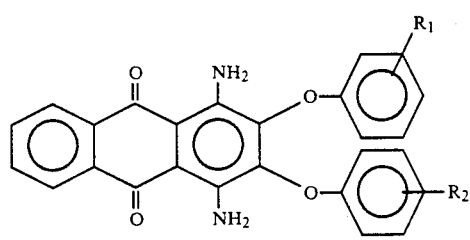

(3)

wherein R is a halogen atom, methyl or methoxy; wherein $R_1$ is a hydrogen atom, hydroxyl, a halogen atom, alkyl of 1 to 4 carbon atoms or alkoxy of 1 to 4 carbon atoms; and wherein $R_2$ is a hydrogen atom, a halogen atom, alkyl of 1 to 4 carbon atoms or alkoxy of 1 to 4 carbon atoms, with the proviso that in formula (3) either $R_1$ or $R_2$ is not a hydrogen atom.

In another composition aspect, the present invention is directed to thermaltransfer sheets useful for thermal transfer processes which employ at least one magenta anthraquinone dyestuff of one of the above formulas, preferably which employ a mixture of at least one of formula (1) and at least one of formula (3).

In a process aspect, this invention relates to sublimation thermaltransfer processes employing an anthraquinone of this invention.

DETAILED DESCRIPTION OF THE PREFERRED EMBODIMENTS

The magenta dyestuffs of this invention can easily be dissolved in a solvent, are excellent with respect to convertibility into ink, sublimation and fastness and are free from migration into and contamination of the base material to which it is transferred by sublimation. The anthraquinones represented by formulas (1), (2) and (3) are described hereinbelow in accordance with preferred embodiments.

The alkyl groups of 1 to 4 carbon atoms, which can be straight-chain or branched, include methyl, ethyl, n-propyl, isopropyl, n-butyl and isobutyl. The alkoxy groups of 1 to 4 carbon atoms can be straight-chain, branched, secondary or tertiary and include methoxy, ethoxy, n-propoxy, isopropoxy, n-butoxy, sec-butoxy and tert-butoxy.

Halogen atoms include fluorine, chlorine, bromine and iodine.

$R^1$ and $R^2$ can be at the o-, m- or p-position.

The anthraquinones represented by the above formulas include 1,4-diamino-2-phenoxyanthraquinones, 1-amino-2-phenoxy-4-hydroxyanthraquinones and 1,4-diamino-2,3-bisphenoxyanthraquinones.

In a preferred 1,4-diamino-2-phenoxyanthraquinone, $R^1$ is at the m-position of the phenoxy group, which anthraquinones can be represented by the general formula (2):

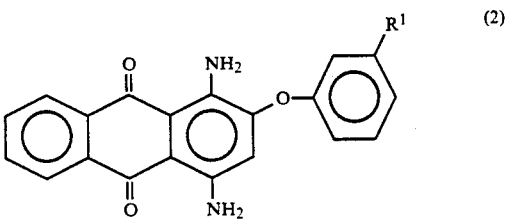

(2)

wherein $R^1$ has the values given above.

The 1,4-diamino-2-phenoxyanthraquinones represented by the general formula (2) have a magenta color and in sublimation thermaltransfer processes using these compounds, the amount thereof to be transferred can be regulated by altering the energy which is fed to the heat-transfer head, so that gradation recordings can easily be produced. Therefore, these magenta anthraquinones are suitable for full color records. In particular, those in which the m-position of the phenoxy group bears a substituent exhibit superior performance characteristics compared to conventional ones.

Preferred examples of $R^1$ in the compounds represented by formula (2) include alkyl groups such as methyl, ethyl, n-propyl, isopropyl and n-butyl; alkoxy groups such as methoxy, ethoxy, n-propoxy and n-butoxy; hydroxyl; and halogen atoms such as fluorine, chlorine and bromine.

Other preferred 1-amino-2-phenoxy-4-hydroxyanthraquinones are those wherein $R^1$ is at the m-position of the phenoxy group, viz. compounds represented by the general formula (1):

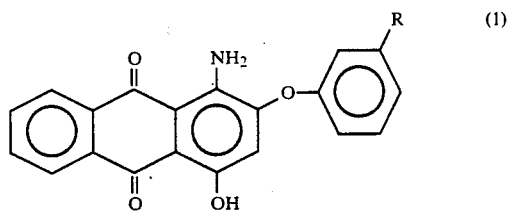

(1)

wherein R is as defined above, except a hydrogen atom.

These compounds which have R at the m-position have better solubility in solvents employed for ink formation, which is the essential requirement of the transfer dyestuff, than the corresponding position isomers in which R is the o- or p-position.

Additionally, when thermally transferred, the amount thereof to be transferred can be regulated by altering the energy which is fed to the heat-transfer head, so that gradation recordings can easily be produced. Therefore, these magenta anthraquinones are suitable for full color records.

Preferred examples of $R^1$ in the compounds represented by formula (IV) include methyl, methoxy and halogen atoms, such as fluorine, chlorine, bromine and iodine.

The 1,4-diamino-2,3-bisphenoxyanthraquinones which are another group of preferred anthraquinones of this invention are compounds represented by the general formula (3):

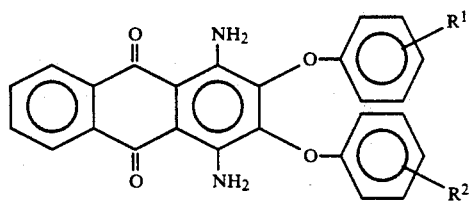
(3)

When thermally transferred, the amount of these 1,4-diamino-2,3-bisphenoxyanthraquinones to be transferred can be regulated by altering the energy which is fed to the heat transfer head, so that halftone printings can easily be produced. Therefore, these compounds are suitable for full color records.

The compounds of formula (3) have particularly good solubility in organic solvents and dispersibility in water, above all, one in which $R^1$ and $R^2$ lie at m-position is better from the view point of solubility in solvents employed for ink formation. Therefore highly concentrated inks in which the dyestuff is uniformly dissolved or dispersed can easily be produced. Consequently, images having good color density can be recorded.

In the compounds of formula (3), the two phenoxy groups can be identical or different but, as noted above, both $R^1$ and $R^2$ are not hydrogen atoms simultaneously.

The anthraquinones represented by the formulas (1), (2) and (3) of the present invention generally have the following common characteristics:

They are stable to heat, light, moisture and chemicals and thus are not thermally decomposed during transfer recording and the recorded images produced therefrom have excellent stability.

The compounds have good solubility in organic solvents and good dispersibility in water and highly concentrated ink in which the dyestuff is uniformly dissolved and dispersed can easily be produced. Consequently, images having good color density can be recorded. Thus, these compounds are commercially valuable.

The anthraquinones represented by formulas (1), (2) and (3) can be synthesized by reacting a compound represented by the general formula (I):

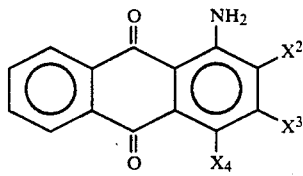
(I)

wherein $X^2$ is a chlorine atom or $NaSO_3$, $X^3$ is a hydrogen atom or chlorine atom, and $X^4$ is a hydroxyl group or $NH_2$ with a compound represented by the general formula (II):

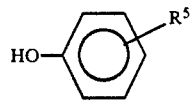
(II)

wherein $R^5$ is a hydrogen atom, an alkyl group of 1 to 4 carbon atoms, an alkoxy group of 1 to 4 carbon atoms, a hydroxyl group or a halogen atom, in an aprotic polar solvent.

The 1,4-diamino-2-phenoxyanthraquinones represented by the general formula (2) can be synthesized by reacting a compound of the general formula (I) in which $X^2$ is a chlorine atom or $NaSO_3$, $X^4$ is $NH_2$ and $X^3$ is a hydrogen atom, i.e., 1,4-diamino-2-chloroanthraquinone or 1,4-diaminoanthraquinone-2-sodium sulfonate, with a substituted phenol represented by the formula

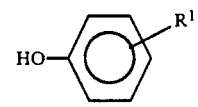

wherein $R^1$ is the same as in the general formula (2), in a polar organic solvent such as sulfolane and in the presence of a base.

The 1-amino-2-phenoxy-4-hydroxyanthraquinones represented by the general formula (1) can be synthesized by thermally reacting a compound represented by the formula (I) in which $X^2$ is a chlorine atom, $X^3$ is a hydrogen atom, and $X^4$ is a hydroxyl group, i.e., 1-amino-2-chloro-4-hydroxyanthraquinone, of the formula

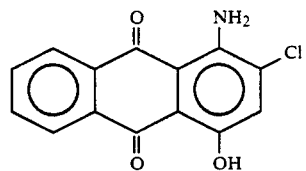

with a phenol represented by the formula

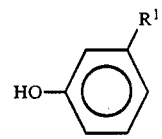

wherein $R^1$ is the same as defined in the general formula (1) except a hydrogen atom, in an aprotic polar solvent in the presence of a base.

The 1,4-diamino-2,3-bisphenoxyanthraquinone dyestuff can be synthesized as follows:

When $R^1$ and $R^2$ in formula (3) are different from each other, there are used compounds represented by the general formulae (III) and (IV):

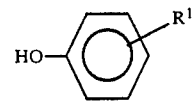
(III)

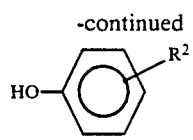

(IV)

wherein $R^1$ and $R^2$ have the same values in the general formula (3) and are different from each other.

First, the compound represented by the formula (I) in which each of $X^2$ and $X^3$ is a chlorine atom, and $X^4$ is $NH_2$, i.e., 1,4-diamino-2,3-dichloroanthraquinone, is reacted with a molar equivalent amount of a compound of formula (III), in an aprotic polar solvent, e.g., at a temperature of 140° to 160° C., to produce a compound represented by the general formula (V):

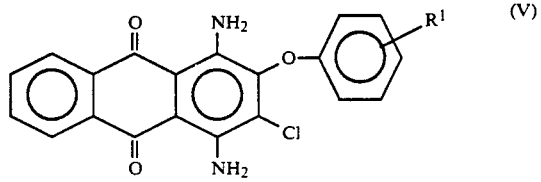

wherein $R^1$ is the same as in the general formula (I), and then isolating the thus produced compound, which is thermally reacted with a compound of formula (IV) in an aprotic polar solvent, e.g., at a temperature of 160° to 180° C., to obtain the desired anthraquinone represented by the general formula (3).

When $R^1$ and $R^2$ in formula (3) are identical, the compound represented by formula (I) in which each of $X^2$ and $X^3$ is a chlorine atom, and $X^4$ is $NH_2$ i.e., 1,4-diamino-2,3-dichloroanthraquinone is reacted with a compound of formula (II) in an aprotic polar solvent, e.g., at a temperature of 160° to 180° C., to produce the desired 1,4-diamino-2,3-bisphenoxyanthraquinone.

Procedures to heat transfer printing of synthetic materials are disclosed in French Patent Nos. 1213330 and 1585119 and in German Patent No. 1769757, and dyestuffs, regulators and auxiliary carriers used in such procedures are disclosed in German Laid-open Patent Application Nos. 1771813 and 171812, all of whose disclosures are incorporated herein by reference.

An ink for thermaltransfer record from an anthraquinone of general formula (1), (2) or (3) can be prepared by mixing the dyestuff with a suitable resin, solvent and the like. Furthermore, the thermaltransfer may be accomplished by first applying the thus obtained ink onto a suitable transfer substrate to form a transfer sheet and then applying this sheet onto the face of the printable substrate onto which an image is to be recorded, and heating and pressing the resulting laminate from the back surface of the transfer sheet by means of a heat-transfer recording head.

The resin used for the preparation of the ink can be one which is used for the manufacture of conventional printing inks, examples of which include oil resins such as rosin, phenolic resin, xylene resin, petroleum resin, vinyl resin, polyamide, alkyd resin, nitrocellulose and alkylcellulose; and aqueous resins such as maleic resin, acrylic resin, casein resin, shellac and glue.

Examples of the solvent which can be used for the preparation of the ink include alcohols such as methanol, ethanol, propanol and butanol; cellosolves such as methyl cellosolve and ethyl cellosolve; aromatics such as benzene, toluene and xylene; esters such as ethyl acetate and butyl acetate; ketones such as acetone, methyl ethyl ketone and cyclohexanone; hydrocarbons such as ligroin, cyclohexane and kerosene; and dimethylformamide. If an aqueous resin is selected, water or a mixture of water and one of the above-mentioned water-miscible solvents can be used.

Suitable examples of transfer substrates onto which the ink is applied include thin papers such as condenser paper and glassine paper; and films of plastics having good heat resistance, such as polyester, polyamide and polyimide. The thickness of the transfer substrate preferably is in the range of 5 to 50 μm so as to increase the heat transfer efficiency from the heat-transfer recording head to the dyestuff.

Examples of the printable materials onto which images can be recorded include fibers, fabrics, films, sheets and molded articles made from polyolefin resins, such as polyethylene and polypropylene; halogenated polymers such as polyvinyl chloride and polyvinylidene chloride; vinyl polymers such as polyvinyl alcohol, polyvinyl acetate and polyacrylic esters; polyester resins, such as polyethylene terephthalate and polybutylene terephthalate; polystyrene resins; polyamide resins; copolymer resins of olefins, such as ethylene and propylene and other vinyl monomers; ionomers; cellulosic resins, such as cellulose diacetate and cellulose triacetate; polycarbonates; polysulfones; polyamides and the like.

Particularly preferred as substrates are fabrics, sheets and films made from polyethylene terephthalate.

Additionally, there can be employed the usual papers employed in thermal printing, e.g., cellulosic papers coated or impregnated with the above-mentioned resins containing acidic fine particles such as silica gel, laminates of resin films, and specially processed papers which have been subjected to an acetylation treatment. When these special papers are used as the printable substrate, good images can be recorded thereon which are excellent in image stability at a high temperature and a high humidity. Moreover, synthetic papers made from various resins can be also used.

After transfer recording the printed surface can be covered with a clear coating. For example, a polyester film can be laminated onto the surface bearing the transferred and recorded image by heat pressing, whereby the color development of the dyestuff and the storage stability of recorded image can be improved.

The performance of the dyestuffs represented by the general formulas (1), (2) and (3) will be described in detail in accordance with examples which follow, in which examples, "part" and "parts" are based on weight. cl EXAMPLE 1

(i) Preparation of Ink

| | |
|---|---|
| 1,4-Diamino-2(3-methylphenoxy) anthraquinone | 3 parts |
| Polybutyral resin | 4.5 parts |
| Methyl ethyl ketone | 46.25 parts |
| Toluene | 14.0 parts |

To prepare an ink, the mixture of the above-mentioned composition was blended by mixing with glass beads for about 30 minutes by means of a paint conditioner.

(ii) Preparation of Transfer Sheet

The thus prepared ink was applied in a conventional manner onto a 9 μm polyethylene terephthalate film, the back surface of which had been subjected to a heat resistance treatment by the use of a gravure calibrater (plate depth=30 μm). The ink was applied at a dry weight rate of about 1.0 g/m². Afterward, the applied ink was dried by heating the film.

(iii) Preparation of Material to be Recorded

| | |
|---|---|
| Polyester Resin (Vylon 103; Toyobo Co., Ltd.; Tg = 47° C.) | 0.8 part |
| EVA Polymeric Plasticizer (Erbaloy 741p; Mitsui Polychemical Co., Ltd.; Tg = −37° C.) | 0.2 part |
| Amino-modified Silicone (KF 857; The Shin-Etsu Chemical Co., Ltd.) | 0.04 part |
| Epoxy-modified Silicone (KF-103; The Shin-Etsu Chemical Co., Ltd.) | 0.04 part |
| Methyl Ethyl Ketone/Toluene/Cyclohexane (weight ratio = 4:4:2) | 9.0 parts |

These components were mixed conventionally in order to prepare a coating solution, which was then applied onto a face of a synthetic paper such as polyethylene or polyester using a bar coater (RK Print Coat Instruments Co., Ltd.; No. 1) at a dry weight rate of about 4.5 g/m², followed by drying at 100° C. for 15 minutes.

(iv) Transfer Recording

The ink-bearing free of the transfer sheet was placed against the coated face of the thus-produced synthetic paper so that the inked surface of the former was in intimate contact with the coated surface of the latter and recording was then achieved by heating and pressing the resulting laminate from the back surface of the transfer sheet by a heat-transfer recording head under conditions of a voltage=10 V and a printing time of 4.0 milliseconds, whereby an image having a magenta color and a color density of 1.9 was recorded.

The color density was measured by the use of a densitometer, model RD-514 (filter=Latten No. 58) made by U.S. Macbeth Co., Ltd. and was calculated in accordance with the following formula:

Color Density=$\log_{10}(Io/I)$ $Io$=Intensity of reflected light from a standard white reflective plate $I$=Intensity of reflected light from a specimen.

For the recorded image, a light resistance test was carried out by the use of a xenon fade meter (Suga Testing Machine Co., Ltd.) at a black panel temperature of 63±2° C. and 90% relative humidity. This test confirmed that the recorded image was scarcely discolored by the irradiation for 40 hours and was excellent in stability at high temperatures and high humidity.

The color fastness of the recorded image was evaluated by allowing the specimen to stand at 50° C. for 48 hours, and then observing the vividness of the image and the colored state of the white paper after the surface of the specimen had been rubbed against a white paper. According to this test, the vividness of the image was unchanged and the white paper against which the image surface had been rubbed was not colored, which indicated that the fastness of the recorded image was good.

In the following examples and comparative examples, the preparation of inks, transfer sheets and materials to be recorded as well as the transfer recording were carried out in accordance with the same procedure as in Example 1. The resulting of color densities are set forth in Table 1.

EXAMPLE 2

1,4-Diamino-2(3-methoxyphenoxy)anthraquinone was used as the dyestuff and a magenta color image having a color density of 1.9 was recorded.

In the color fastness test, the vividness of the recorded image was unchanged and a white paper against which the surface of the image had been rubbed was not colored. In addition, color fastness was good.

EXAMPLE 3

1,4-Diamino-2(3-chlorophenoxy)anthraquinone was used as the dyestuff and a magenta color image having a color density of 2.0 was recorded.

In the color fastness test, the vividness of the recorded image was unchanged and a white paper against which the surface of the image had been rubbed was not colored. In addition, color fastness was good.

EXAMPLE 4

1,4-Diamino-2(3-hydroxyphenoxy)anthraquinone was used as the dyestuff and a magenta color image having a color density of 1.9 was recorded.

In the color fastness test, the vividness of the recorded image was unchanged and a white paper against which the surface of the image had been rubbed was not colored. In addition, color fastness was good.

EXAMPLE 5

1-Amino-2(3-methylphenoxy)-4-hydroxylanthraquinone was used as the dyestuff and a magenta color image having a color density of 1.9 was recorded.

The stability of the image at a high temperature and a high humidity was excellent. In the color fastness test, the vividness of the recorded image was unchanged and a white paper against which the surface of the image had been rubbed was not colored. In addition, color fastness was good.

EXAMPLES 6, 7 and 9 to 14

In these examples the respective dyestuffs shown in Table 1 were used and vivid magenta color images having color densities shown in Table 1 were transferred and recorded.

Furthermore, the light resistance and fastness of the recorded images were good, as in Example 1.

EXAMPLE 8

1,4-Diamino-2,3-bis(3-methylphenoxy)anthraquinone was used as the dyestuff and a magenta color image having a color density of 1.8 was recorded.

The stability of the image at a high temperature and a high humidity was excellent. In the color fastness test, the vividness of the recorded image was unchanged and a white paper against which the surface of the image had been rubbed was not colored. In addition, fastness was good.

COMPARATIVE EXAMPLE 1

1,4-Diamino-2(2-hydroxyphenoxy)anthraquinone was used as the dyestuff and a magenta color image having a color density of only 0.61 was recorded. In the color fastness test, the vividness of the recorded image was poor and a white paper against which the surface of the image had been rubbed was colored.

COMPARATIVE EXAMPLE 2

1,4-Diamino-2(4-hydroxyphenoxy)anthraquinone was used as the dyestuff and a magenta color image having a color density of only 0.54 was recorded. Moreover, in the color fastness test, the vividness of the recorded image was poor and a white paper against which the surface of the image had been rubbed was colored.

COMPARATIVE EXAMPLE 3

1-Amino-2-phenoxy-4-hydroxyanthraquinone was used as the dyestuff to prepare an ink. However, the dyestuff did not dissolve acceptably in the solvent and a part of the dyestuff remained undissolved in the form of coarse crystals.

Material to be recorded, application of the ink to a transfer sheet and drying were then carried out as described above. The transfer sheet produced therefrom was not uniform and coarse grains were deposited thereon.

Transfer recording was performed using the transfer sheet. A non-uniform image was transferred and recorded and overall the quality of the image was poor.

COMPARATIVE EXAMPLES 4 and 5

1-Amino-2(2-methylphenoxy)-4-hydroxyanthraquinone and 1-amino-2(4-methoxyphenoxy)-4-hydroxyanthraquinone were used as dyestuffs to prepare thermal inks. Materials to be recorded were then prepared, followed by applying the ink to the transfer sheet, drying and transfer recording, all as in Comparative Example 3. The results obtained with the respective dyestuffs were similar to those of Comparative Example 3 and the overall quality of the images was poor.

EXAMPLES 15–18

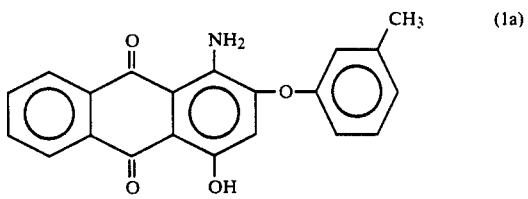

(1a)

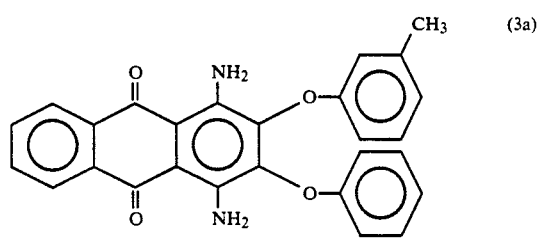

(3a)

Tests were conducted for each ratio of the anthraquinone of formula (3a) to formula (1a) indicated in table 1 using inks comprising the following proportions (weight basis):

| | |
|---|---|
| Anthraquinones of formulas (3a) and (1a) | 3.0 parts |
| Polybutyral resin | 4.5 parts |
| Methyl ethyl ketone | 46.25 parts |
| Toluene | 46.25 parts |

To prepare an ink, a mixture of the above composition was blended by mixing with glass beads for about 30 minutes by means of a paint conditioner.

Evaluations for light-fade resistance and color fastness were done in the same manner as in Example 1 in the original specification.

As a result, the tests in all cases confirmed that the recorded images having a magenta color were scarcely discolored and had excellent stability at high temperatures and high humidity, and that the color fastness of the recorded images was good. The vividness of the images was unchanged and the white paper against which the image surfaces was rubbed was not colored.

The resulting color densities are set forth in Table 1.

TABLE 1

| | Dyestuff | Color Density |
|---|---|---|
| Example 1 | 1,4-Diamino-2(3-methylphenoxy)anthraquinone | 1.9 |
| Example 2 | 1,4-Diamino-2(3-methoxyphenoxy)anthraquinone | 1.9 |
| Example 3 | 1,4-Diamino-2(3-chlorophenoxy)anthraquinone | 2.0 |
| Example 4 | 1,4-Diamino-2(3-hydroxyphenoxy)anthraquinone | 1.9 |
| Example 5 | 1-Amino-2(3-methylphenoxy)-4-hydroxyanthraquinone | 1.9 |
| Example 6 | 1-Amino-2(3-methoxyphenoxy)-4-hydroxyanthraquinone | 1.8 |
| Example 7 | 1-Amino-2(3-chlorophenoxy)-4-hydroxyanthraquinone | 1.6 |
| Example 8 | 1,4-Diamino-2,3bis(3-methylphenoxy)anthraquinone | 1.8 |
| Example 9 | 1,4-Diamino-2,3bis(2-methylphenoxy)anthraquinone | 1.7 |
| Example 10 | 1,4-Diamino-2,3bis(3-methoxyphenoxy)anthraquinone | 1.6 |
| Example 11 | 1,4-Diamino-2,3bis(4-tert-butylphenoxy)anthraquinone | 1.4 |
| Example 12 | 1,4-Diamino-2-phenoxy-3(3-methylphenoxy)anthraquinone | 1.5 |
| Example 13 | 1,4-Diamino-2,3bis(3-chlorophenoxy)anthraquinone | 1.4 |
| Example 14 | 1,4-Diamino-2,3bis(4-methylphenoxy)anthraquinone | 1.7 |
| Comp. Ex. 1 | 1,4-Diamino-2(2-hydroxyphenoxy)anthraquinone | 0.61 |
| Comp. Ex. 2 | 1,4-Diamino-2(4-hydroxyphenoxy)anthraquinone | 0.54 |
| Comp. Ex. 3 | 1-Amino-2-phenoxy-4-hydroxyanthraquinone | 1.2 |
| Comp. Ex. 4 | 1-Amino-2(2-methylphenoxy)-4-hydroxyanthraquinone | 1.0 |
| Comp. Ex. 5 | 1-Amino-2(4-methoxyphenoxy)-4-hydroxyanthraquinone | 0.8 |

In the following examples, transfer sheets, materials to be recorded and the transfer recording were carried out in accordance with the procedure of Example 1.

TABLE 1

| Example | Ratio of (3a) to (1a) (3a):(1a) | | Color Density |
|---------|------|------|------|
| 15 | 0.9 | 2.1 | 2.10 |
| 16 | 1.2 | 2.8 | 2.00 |
| 17 | 1.2 | 2.8 | 2.40 |
| 18 | 1.6 | 2.4 | 2.30 |

EXAMPLES 19-31

In these examples, the anthraquinones represented by general formulas (3) and (1) were used. The same tests were conducted using inks of the same composition except for the anthraquinones indicated in Table 2.

As a result, the tests confirmed that the light resistance and color fastness of the recorded images having a magenta color were good in all cases as in Example 1. The resulting color densities are shown in Table 2.

Although the invention has been described with preferred embodiments, it is to be understood that variations and modifications may be resorted to as will be apparent to those skilled in the art. Such variations and modifications are to be considered within the purview and the scope of the claims appended hereto.

TABLE 2

| Example | Formula (3) $R_1$ | $R_2$ | Parts | Formula (1) R | Parts | Color density |
|---------|------|------|------|------|------|------|
| 19 | m-$CH_3$ | p-$C_2H_5$ | 0.9 | $CH_3$ | 2.1 | 1.80 |
| 20 | m-$CH_3$ | p-Cl | 0.9 | $CH_3$ | 2.1 | 1.75 |
| 21 | m-$CH_3$ | m-Cl | 1.05 | $CH_3$ | 1.95 | 1.75 |
| 22 | m-$CH_3$ | o-Cl | 1.2 | $CH_3$ | 1.8 | 1.74 |
| 23 | m-$CH_3$ | p-$OCH_3$ | 0.9 | $CH_3$ | 2.1 | 1.75 |
| 24 | m-$CH_3$ | m-$OCH_3$ | 1.2 | $CH_3$ | 1.8 | 1.75 |
| 25 | p-$CH_3$ | m-$C_2H_5$ | 1.05 | $CH_3$ | 1.95 | 1.82 |
| 26 | p-$CH_3$ | p-$C_2H_5$ | 0.9 | $CH_3$ | 2.1 | 1.78 |
| 27 | p-$CH_3$ | p-$C_2H_5$ | 1.2 | Cl | 1.8 | 1.75 |
| 28 | m-$CH_3$ | H | 1.05 | Cl | 1.95 | 1.76 |
| 29 | m-$CH_3$ | H | 1.2 | $OCH_3$ | 1.8 | 1.73 |
| 30 | O—$CH_3$ | O—$C_2H_5$ | 0.9 | $OCH_3$ | 2.1 | 1.70 |
| 31 | H | 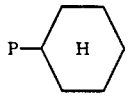 | 1.2 | $CH_3$ | 1.8 | 1.65 |

What is claimed is:

1. A sublimation thermaltransfer printing sheet comprising a substrate having applied thereto an ink comprising a dyestuff, a binder resin and a solvent, wherein said dyestuff comprises a compound of one of the formulas:

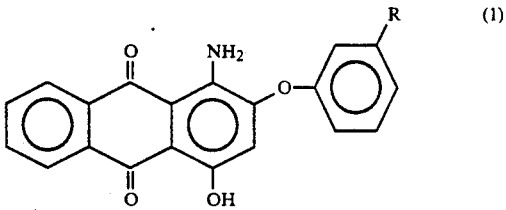

(1)

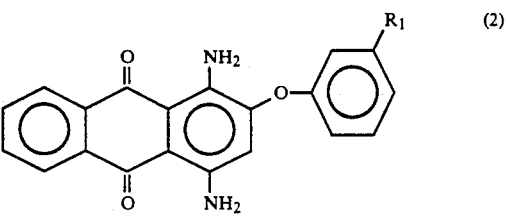

(2)

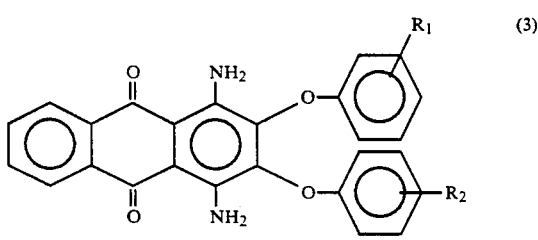

(3)

wherein R is a halogen atom, methyl or methoxy; wherein $R_1$ is a hydrogen atom, hydroxyl, a halogen atom, alkyl of 1 to 4 carbon atoms or alkoxy of 1 to 4 carbon atoms; and wherein $R_2$ is a hydrogen atom, a halogen atom, alkyl of 1 to 4 carbon atoms or alkoxy of 1 to 4 carbon atoms, with the proviso that in formula (3) either $R_1$ or $R_2$ is not a hydrogen atom.

2. A thermaltransfer printing sheet of claim 1 comprising a compound of formula (1).

3. A thermaltransfer printing sheet of claim 1 comprising a compound of formula 1 wherein R is a chlorine atom.

* * * * *

UNITED STATES PATENT AND TRADEMARK OFFICE
CERTIFICATE OF CORRECTION

PATENT NO. : 5,300,475
DATED : April 5, 1994
INVENTOR(S) : Keisuke TAKUMA et al.

It is certified that error appears in the above-indentified patent and that said Letters Patent is hereby corrected as shown below:

Title Page:

Item (63); Related U.S. Application Data:

"Patent No. 5,168,092" Should read . . .

-- 5,168,093 --

Signed and Sealed this

Second Day of August, 1994

*Attest:*

BRUCE LEHMAN

*Attesting Officer*         Commissioner of Patents and Trademarks

UNITED STATES PATENT AND TRADEMARK OFFICE
CERTIFICATE OF CORRECTION

PATENT NO. : 5,300,475
DATED : April 5, 1994
INVENTOR(S) : Keisuke Takuma et al

It is certified that error appears in the above-indentified patent and that said Letters Patent is hereby corrected as shown below:

On the title page:

Item (73)    Assignee:

Delete "Chemicals" should read . . .

--Mitsui Toatsu Chemicals--.

Signed and Sealed this

Twentieth Day of December, 1994

Attest:

BRUCE LEHMAN

Attesting Officer   Commissioner of Patents and Trademarks